US012580288B2

(12) United States Patent
Kan

(10) Patent No.: US 12,580,288 B2
(45) Date of Patent: *Mar. 17, 2026

(54) DIELECTRIC FILTER AND DIELECTRIC RESONATOR

(71) Applicant: Murata Manufacturing Co., Ltd., Kyoto-fu (JP)

(72) Inventor: Tatsunori Kan, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 296 days.

This patent is subject to a terminal disclaimer.

(21) Appl. No.: 18/465,262

(22) Filed: Sep. 12, 2023

(65) Prior Publication Data

US 2024/0006733 A1 Jan. 4, 2024

Related U.S. Application Data

(63) Continuation of application No. PCT/JP2022/013121, filed on Mar. 22, 2022.

(30) Foreign Application Priority Data

Mar. 29, 2021 (JP) ................................ 2021-055347

(51) Int. Cl.
*H01P 1/20* (2006.01)
*H01P 3/16* (2006.01)

(52) U.S. Cl.
CPC .............. *H01P 1/2002* (2013.01); *H01P 3/16* (2013.01)

(58) Field of Classification Search
CPC ........... H03H 2001/0085; H03H 9/605; H03H 9/178; H03H 9/564; H03H 9/17;
(Continued)

(56) References Cited

U.S. PATENT DOCUMENTS 6,294,967 B1 * 9/2001 Hirai .................. H01P 1/20345 333/204
11,862,835 B2 1/2024 Chou et al.
(Continued)

FOREIGN PATENT DOCUMENTS

JP H04-043703 A 2/1992
JP H05-267907 A 10/1993
(Continued)

OTHER PUBLICATIONS

International Search Report for PCT/JP2022/013121 dated Jun. 14, 2022.

(Continued)

*Primary Examiner* — John W Poos
(74) *Attorney, Agent, or Firm* — McDonald Hopkins LLC

(57) ABSTRACT

A filter device includes a laminated body, plate electrodes, shield terminals, a plurality of resonator portions, and a plurality of capacitor portions facing the plurality of resonator portions in a Y-axis direction, respectively. Each of the resonator portions is formed by a plurality of resonant electrode elements. Each of the capacitor portions is formed by a plurality of capacitive electrode elements. A part in each of the plurality of resonant electrode elements that faces the capacitive electrode elements extends in a direction along the Y-axis direction. The plurality of capacitive electrode elements extend in a direction that intersects with the Y-axis direction.

18 Claims, 6 Drawing Sheets

(58) Field of Classification Search
CPC ........ H03H 9/25; H03H 9/725; H03H 9/1014; H03H 9/6483; H03H 9/173; H03H 9/54; H03H 9/02157; H03H 9/02015; H03H 9/171; H03H 9/132; H03H 9/175; H03H 9/177; H03H 9/145; H03H 9/13; H03H 9/131; H03H 9/02574; H03H 9/542; H03H 9/02; H03H 9/205; H03H 9/0561; H01P 1/20345; H01P 1/20; H01P 7/10; H01P 7/082; H01P 1/205
See application file for complete search history.

(56) References Cited

U.S. PATENT DOCUMENTS 12,051,847 B2 7/2024 Tada et al.
2006/0181370 A1 * 8/2006 Lee .................... H01P 1/20345 333/204
2013/0154768 A1 * 6/2013 Taniguchi ................ H03H 7/09 333/185
2017/0142838 A1 5/2017 Kurosawa

FOREIGN PATENT DOCUMENTS

JP H08-288706 A 11/1996
JP 2003-218604 A 7/2003
JP 2007-158440 A 6/2007
JP 2007-235465 A 9/2007
JP 2017-098527 A 6/2017
JP 2020-510326 A 4/2020

OTHER PUBLICATIONS

International Search Report for PCT/JP2022/000654 dated Mar. 29, 2022.

* cited by examiner

DIELECTRIC FILTER AND DIELECTRIC RESONATOR

CROSS REFERENCE TO RELATED APPLICATION

This is a continuation of International Application No. PCT/JP2022/013121 filed on Mar. 22, 2022 which claims priority from Japanese Patent Application No. 2021-055347 filed on Mar. 29, 2021. The contents of these applications are incorporated herein by reference in their entireties.

BACKGROUND OF THE DISCLOSURE

Field of the Disclosure

The present disclosure relates to a band-pass filter (hereinafter also referred to as a "dielectric filter") using a dielectric resonator, and the dielectric resonator.

Description of the Related Art

In Japanese Patent Laid-Open No. 2007-235465 (PTL 1), a band-pass filter using a dielectric resonator is described. The filter includes a cuboid laminated body formed by laminating a plurality of dielectric layers in a lamination direction, a first terminal and a second terminal disposed on a first side surface and a second side surface facing each other in the laminated body, respectively, and a resonator portion and a capacitor portion disposed on the inside of the laminated body. The resonator portion is formed by a plurality of electrode elements laminated in the lamination direction, connected to the first terminal, and spaced apart from the second terminal. Out of the plurality of electrode elements of the resonator portion, an electrode element in an upper layer and an electrode element in a lower layer protrude more to the second terminal side as compared to other electrode elements. The capacitor portion is formed by one electrode element, is connected to the second terminal, extends between the electrode element in the upper layer and the electrode element in the lower layer of the resonator portion, and forms a capacity between the capacitor portion and the resonator portion by a gap between the electrode element in the upper layer and the electrode element in the lower layer of the resonator portion in the lamination direction.

PTL 1: Japanese Patent Laid-Open No. 2007-235465

BRIEF SUMMARY OF THE DISCLOSURE

In general, when a material (ceramic, resin, and the like) to which heat treatment is applied in a manufacturing process is employed as a material of a laminated body forming a dielectric filter, a region (hereinafter also referred to as a "distortion region") in which non-linear distortion in a lamination direction easily occurs due to shrinkage of the material exists in an outer peripheral portion of the laminated body. In the filter described in Japanese Patent Laid-Open No. 2007-235465, the capacitor portion is disposed in the outer peripheral portion of the laminated body, in other words, "the distortion region" described above. Therefore, there is a concern that a size of the gap between the capacitor portion and the resonator portion in the lamination direction may not be stable and variations in characteristics of the filter may increase. When the capacitor portion is disposed in a region (hereinafter also referred to as a "stable region") on the inner side relative to the distortion region in the laminated body as a countermeasure, the distortion region is disposed on the outer side relative to the capacitor portion, and there is a concern that the filter may be upsized.

The present disclosure has been made in order to solve the problem as above, and a possible benefit thereof is to stabilize the characteristics of a dielectric filter while suppressing upsizing of the dielectric filter. Another possible benefit of the present disclosure is to stabilize the characteristics of a dielectric resonator while suppressing upsizing of the dielectric resonator.

A dielectric filter according to the present disclosure includes: a cuboid laminated body formed by laminating a plurality of dielectric layers in a lamination direction, the cuboid laminated body having a first side surface and a second side surface perpendicular to a first direction orthogonal to the lamination direction; a first plate electrode and a second plate electrode disposed to be spaced apart from each other in the lamination direction on an inside of the laminated body; a first terminal and a second terminal disposed on the first side surface and the second side surface of the laminated body, respectively, and connected to the first plate electrode and the second plate electrode; a plurality of resonator portions disposed side by side in a second direction orthogonal to the lamination direction and the first direction in a region between the first plate electrode and the second plate electrode in the laminated body; and a plurality of capacitor portions disposed to face the plurality of resonator portions, respectively, in the first direction in a region between the plurality of resonator portions and the second terminal in the laminated body. Each of the plurality of resonator portions is formed by a plurality of resonant electrode elements laminated in the lamination direction, is connected to the first terminal, and is spaced apart from the second terminal. Each of the plurality of capacitor portions is formed by a plurality of capacitive electrode elements laminated in the lamination direction, is connected to the second terminal, and forms a capacity between the capacitor portion and the resonator portion that faces the capacitor portion in the first direction. A part in each of the plurality of resonant electrode elements that faces the capacitive electrode elements extends in a direction along the first direction. At least one of the plurality of capacitive electrode elements extends in a direction that intersects with the first direction.

A dielectric resonator according to the present disclosure includes: a cuboid laminated body formed by laminating a plurality of dielectric layers in a lamination direction, the cuboid laminated body having a first side surface and a second side surface perpendicular to a first direction orthogonal to the lamination direction; a first plate electrode and a second plate electrode disposed to be spaced apart from each other in the lamination direction on an inside of the laminated body; a first terminal and a second terminal that are disposed on the first side surface and the second side surface of the laminated body, respectively, and connected to the first plate electrode and the second plate electrode; a resonator portion disposed in a region between the first plate electrode and the second plate electrode in the laminated body; a capacitor portion disposed to face the resonator portion in the first direction in a region between the resonator portion and the second terminal in the laminated body. The resonator portion is formed by a plurality of resonant electrode elements laminated in the lamination direction, is connected to the first terminal, and is spaced apart from the second terminal. The capacitor portion is formed by a plurality of capacitive electrode elements laminated in the lamination direction, is connected to the second terminal, and forms a capacity between the capacitor portion and the resonator portion that faces the capacitor portion in the first direction. A part in each of the plurality of resonant electrode elements that faces the capacitive electrode elements extends in a direction along the first direction. At least one of the plurality of capacitive electrode elements extends in a direction that intersects with the first direction.

According to the present disclosure, it is possible to stabilize the characteristics of the dielectric filter while suppressing the upsizing of the dielectric filter. According to the present disclosure, it is possible to stabilize the characteristics of the dielectric resonator while suppressing the upsizing of the dielectric resonator.

DETAILED DESCRIPTION OF THE DISCLOSURE

Figure 1:
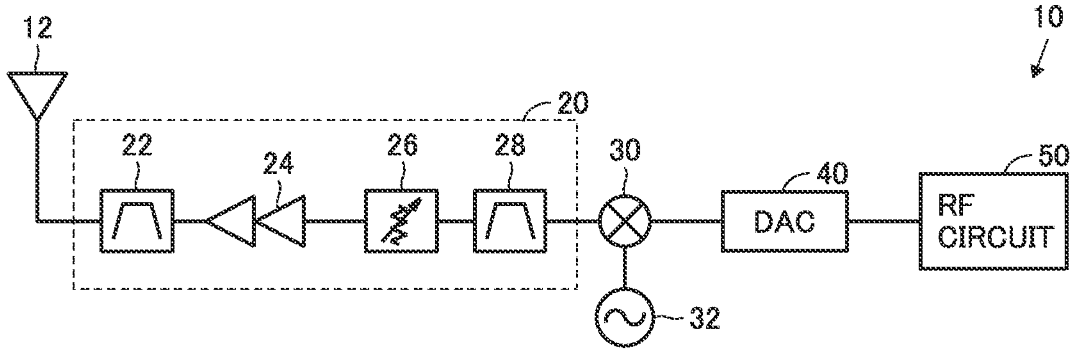
FIG. 1 is a block diagram of a communication device.

An embodiment of the present disclosure is described in detail below with reference to the drawings. The same or equivalent parts in the drawings are denoted by the same reference characters, and description thereof is not repeated.

(Basic Configuration of Communication Device)

FIG. 1 is a block diagram of a communication device 10 having a high-frequency front-end circuit 20 to which a filter device according to an embodiment of the present disclosure is applied. Communication device 10 is a mobile terminal as represented by a smartphone or a mobile phone base station, for example.

With reference to FIG. 1, communication device 10 includes an antenna 12, high-frequency front-end circuit 20, a mixer 30, a local oscillator 32, a D/A converter (DAC) 40, and an RF circuit 50. High-frequency front-end circuit 20 includes band-pass filters 22, 28, an amplifier 24, and an attenuator 26. In FIG. 1, a case where high-frequency front-end circuit 20 includes a transmission circuit that transmits high-frequency signals from antenna 12 is described. However, high-frequency front-end circuit 20 may include a reception circuit that receives high-frequency signals via antenna 12.

Communication device 10 upconverts a signal transmitted from RF circuit 50 to a high-frequency signal and emits the high-frequency signal from antenna 12. A modulated digital signal output from RF circuit 50 is converted to an analog signal by D/A converter 40. Mixer 30 upconverts the signal converted to the analog signal by D/A converter 40 to a high-frequency signal by mixing the signal with an oscillation signal from local oscillator 32. Band-pass filter 28 removes spurious waves generated by upconversion and extracts only signals in a desired frequency band. Attenuator 26 adjusts the intensity of a transmission signal. Amplifier 24 amplifies the electric power of the transmission signal that has passed through attenuator 26 to a predetermined level. Band-pass filter 22 removes spurious waves generated in the amplification process and causes only signal components in a frequency band defined by a communication standard to pass. The transmission signal that has passed through band-pass filter 22 is emitted from antenna 12.

The filter device corresponding to the present disclosure can be employed as band-pass filters 22, 28 in communication device 10 as described above.

(Configuration of Filter Device)

Figure 2:
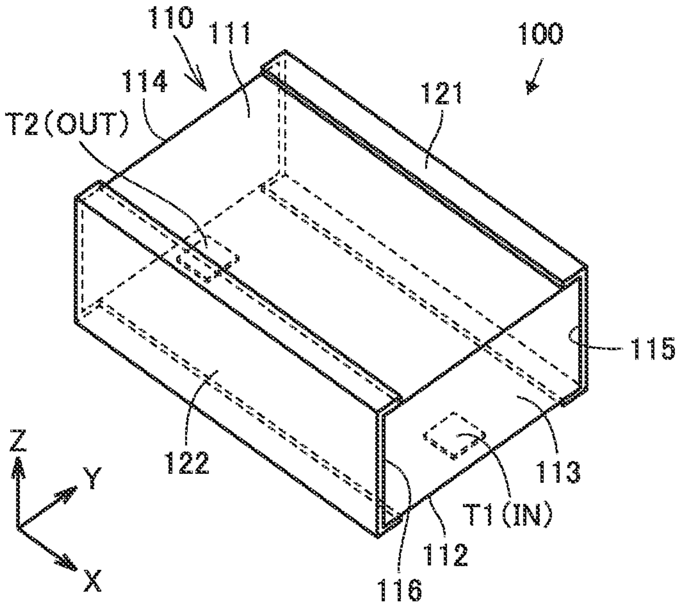
FIG. 2 is an external perspective view of a filter device.
Figure 3:
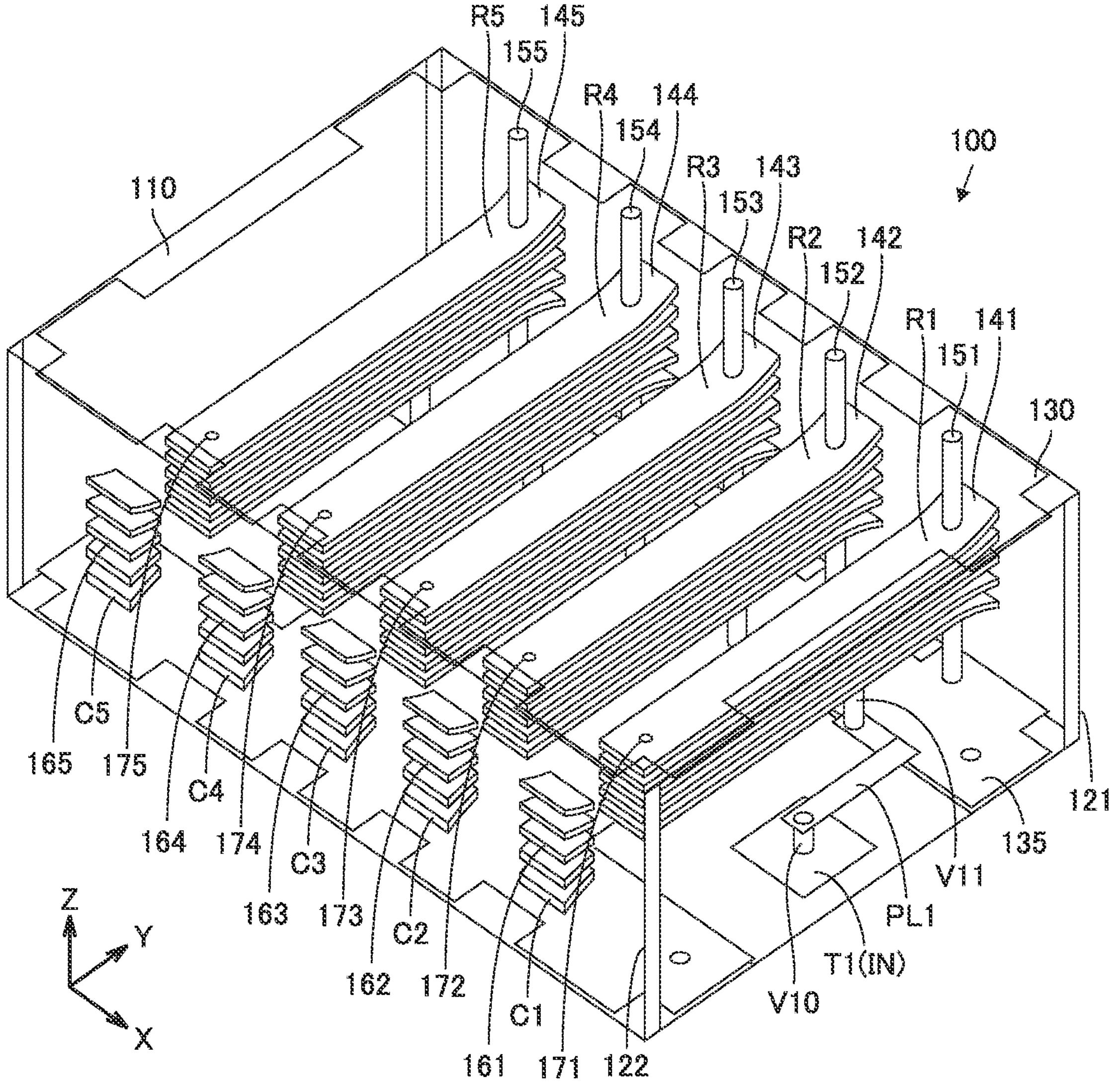
FIG. 3 is a transparent perspective view showing an inner structure of the filter device.
Figure 4:
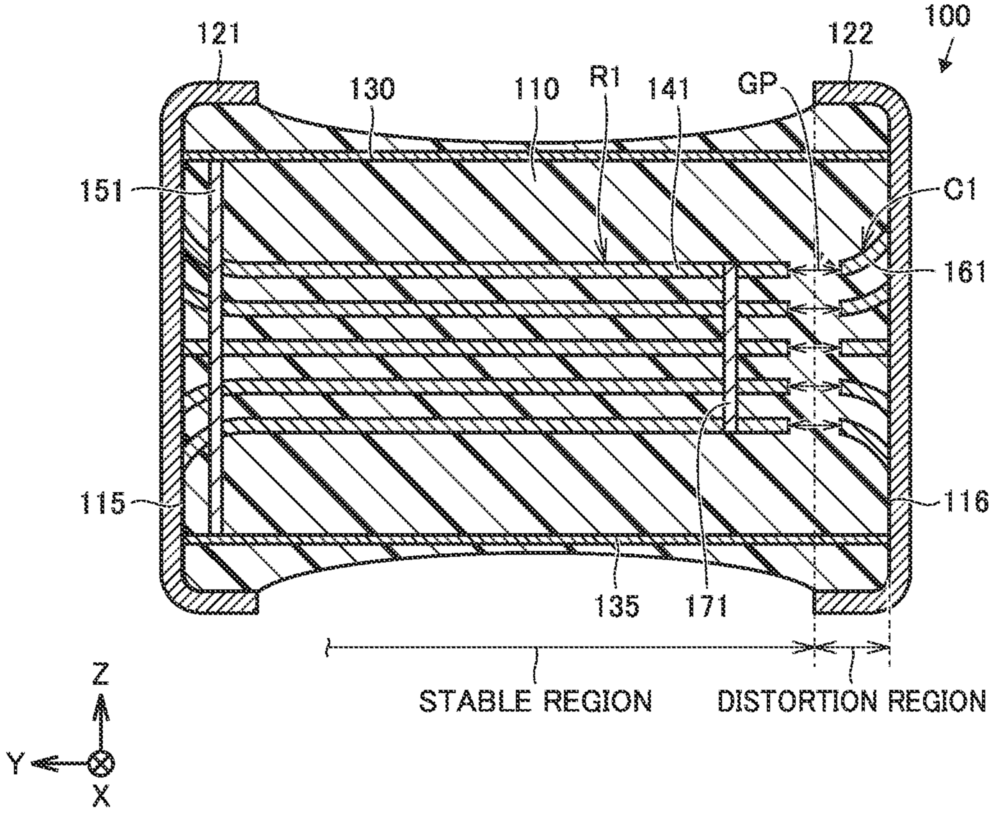
FIG. 4 is one example (part one) of a cross-sectional view of the filter device.

Next, with reference to FIG. 2 to FIG. 4, a detailed configuration of a filter device 100 according to the present embodiment is described. Filter device 100 is a dielectric filter configured by a plurality of resonators (resonator portions).

FIG. 2 is an external perspective view of filter device 100. In FIG. 2, only configurations that can be viewed from an outer front surface of filter device 100 are shown, and configurations on the inside are omitted. Meanwhile, FIG. 3 is a transparent perspective view showing an inner structure of filter device 100.

With reference to FIG. 2, filter device 100 includes a cuboid or substantially cuboid laminated body 110 formed by laminating a plurality of dielectric layers in a lamination direction. Each dielectric layer of laminated body 110 is formed by ceramic such as low temperature co-fired ceramics (LTCC). The material of laminated body 110 is not necessarily limited to ceramic and may be resin, for example.

On the inside of laminated body 110, resonant electrode elements that form the resonator portions, and capacitors and inductors for coupling the resonant electrode elements to each other are formed by a plurality of electrodes formed on each dielectric layer and a plurality of vias formed between the dielectric layers. In the present specification, the term "via" means a conductor that is formed to connect electrodes formed in different dielectric layers to each other and that extends in the lamination direction. The via is formed by a conductive paste, plating, and/or a metal pin, for example.

In the description below, the lamination direction of laminated body 110 is a "Z-axis direction", a direction perpendicular to the Z-axis direction and along a short edge of laminated body 110 is a "Y-axis direction" (first direction), and a direction along a long edge of laminated body 110 is an "X-axis direction" (second direction). A positive direction of a Z-axis in each drawing may be referred to as an upper side, and a negative direction of the Z-axis may be referred to as a lower side below.

As shown in FIG. 2, in filter device 100, shield terminals 121, 122 are disposed so as to respectively cover side surfaces 115, 116 perpendicular to the Y-axis direction in laminated body 110. Shield terminals 121, 122 each have a substantially C-like shape when viewed from the X-axis direction of laminated body 110. In other words, shield terminals 121, 122 cover a part of an upper surface 111 and a lower surface 112 of laminated body 110. Parts of shield terminals 121, 122 disposed on lower surface 112 of laminated body 110 are connected to a ground electrode on a mounting substrate (not shown) by a connecting member such as a solder bump. In other words, shield terminals 121, 122 also function as ground terminals.

An input terminal T1 and an output terminal T2 are disposed on lower surface 112 of laminated body 110. Input terminal T1 is disposed on lower surface 112 at a position close to side surface 113 in the positive direction of the X-axis. Output terminal T2 is disposed on lower surface 112 at a position close to side surface 114 in the negative direction of the X-axis. Input terminal T1 and output terminal T2 are connected to corresponding electrodes on the mounting substrate by connecting members such as solder bumps.

Next, with reference to FIG. 3, filter device 100 further includes plate electrodes 130, 135, a plurality of resonator portions R1 to R5, connection conductors 151 to 155, 171 to 175, and a plurality of capacitor portions C1 to C5 in addition to the configurations shown in FIG. 2. Connection conductors 151 to 155, 171 to 175 may be omitted.

Plate electrodes 130, 135 are disposed to face each other in positions spaced apart from each other in the lamination direction (Z-axis direction) on the inside of laminated body 110. Plate electrode 130 is formed in a dielectric layer close to upper surface 111 and is connected to shield terminals 121, 122 at end portions along the X-axis. Plate electrode 130 has a shape that substantially covers upper surface 111 of laminated body 110 when viewed in a planar view from the lamination direction.

Plate electrode 135 is formed in a dielectric layer close to lower surface 112. Plate electrode 135 has a substantially H-like shape in which cut-out portions are formed in parts facing input terminal T1 and output terminal T2 when viewed in a planar view from the lamination direction. Plate electrode 135 is also connected to shield terminals 121, 122 at end portions along the X-axis.

The plurality of resonator portions R1 to R5 are disposed in a region between plate electrode 130 and plate electrode 135 on the inside of laminated body 110. The plurality of resonator portions R1 to R5 are disposed side by side to be spaced apart from each other by a predetermined distance in the X-axis direction. More specifically, resonator portions R1, R2, R3, R4, R5 are disposed in the stated order from the positive direction to the negative direction of the X-axis.

Each of resonator portions R1 to R5 extends in the Y-axis direction, and an end portion of each resonator portion in the positive direction of the Y-axis is connected to shield terminal 121. Meanwhile, an end portion of each resonator portion in the negative direction of the Y-axis is spaced apart from shield terminal 122.

Resonator portion R1 is formed by a plurality of (five in the example shown in FIG. 3) resonant electrode elements 141 laminated in the lamination direction. Similarly, resonator portion R2 is formed by a plurality of resonant electrode elements 142 laminated in the lamination direction, resonator portion R3 is formed by a plurality of resonant electrode elements 143 laminated in the lamination direction, resonator portion R4 is formed by a plurality of resonant electrode elements 144 laminated in the lamination direction, and resonator portion R5 is formed by a plurality of resonant electrode elements 145 laminated in the lamination direction.

In the present embodiment, widths (the dimensions in the X-axis direction) of the plurality of resonant electrode elements 141 are the same. However, widths of elements formed in the uppermost layer and the lowermost layer out of the plurality of resonant electrode elements 141 may be smaller than widths of elements formed in layers near the center. The same applies to other resonant electrode elements 142 to 145.

Resonator portions R1 to R5 are connected to plate electrodes 130, 135, respectively, via connection conductors 151 to 155 at positions close to end portions in the positive direction of the Y-axis. In filter device 100, each of connection conductors 151 to 155 extends from plate electrode 130 to plate electrode 135 by passing through the plurality of elements of a corresponding resonator portion. Connection conductors 151 to 155 are electrically connected to the plurality of corresponding resonator portions, respectively.

The plurality of resonant electrode elements configuring each of resonator portions R1 to R5 are electrically connected by connection conductors 171 to 175 at positions close to end portions in the negative direction of the Y-axis. A distance between connection conductor 151 and connection conductor 171 is set to λ/4, where λ represents a wavelength of the transmitted high-frequency signal in resonator portion R1. The same applies to other resonator portions R2 to R5.

Resonator portions R1 to R5 are central conductors formed by a plurality of conductors and each function as a distributed-parameter TEM mode resonator using plate electrodes 130, 135 as external conductors.

An element in the lowermost layer out of the plurality of resonant electrode elements 141 forming resonator portion R1 is connected to input terminal T1 via vias V10, V11 and a plate electrode PL1. In FIG. 3, although hidden by the resonant electrode elements, an element in the lowermost layer out of the plurality of resonant electrode elements 145 forming resonator portion R5 is connected to output terminal T2 via vias and a plate electrode. Resonator portions R1 to R5 are magnetically coupled to each other, and a high-frequency signal input to input terminal T1 is transmitted by resonator portions R1 to R5 and output from output terminal T2. At this time, an attenuation pole is generated due to a coupling degree between the resonator portions. As a result, filter device 100 functions as a band-pass filter.

Capacitor portions C1 to C5 are disposed to face the end portions of resonator portions R1 to R5 in the negative direction of the Y-axis, respectively. In other words, an end portion of each of capacitor portions C1 to C5 in the positive direction of the Y-axis faces an end portion of the corresponding resonator portion in the negative direction of the Y-axis to be spaced apart from the end portion of the corresponding resonator portion by a predetermined distance in the Y-axis direction. Meanwhile, an end portion of each of capacitor portions C1 to C5 in the negative direction of the Y-axis is connected to shield terminal 122. As a result, the end portion of each capacitor portion in the positive direction of the Y-axis forms a capacity between the end portion of the capacitor portion and an end portion of the resonator portion, which faces the end portion of the capacitor portion in the Y-axis direction, in the negative direction of the Y-axis. The capacitance can be adjusted by adjusting a size of gap GP between the capacitor portion and the resonator portion in the Y-axis direction.

Capacitor portion C1 is formed by a plurality of (five in the example shown in FIG. 3) capacitive electrode elements 161 laminated in the lamination direction. Similarly, capacitor portion C2 is formed by a plurality of capacitive electrode elements 162 laminated in the lamination direction, capacitor portion C3 is formed by a plurality of capacitive electrode elements 163 laminated in the lamination direction, capacitor portion C4 is formed by a plurality of capacitive electrode elements 164 laminated in the lamination direction, and capacitor portion C5 is formed by a plurality of capacitive electrode elements 165 laminated in the lamination direction.

In FIG. 3, an example in which the number of resonant electrode elements 141 of resonator portion R1 is "five" that is the same as the number of capacitive electrode elements 161 of capacitor portion C1, and five resonant electrode elements 141 are formed in the same layers as five capacitive electrode elements 161, respectively, is shown. However, the number of capacitive electrode elements 161 does not necessarily need to be the same as the number of resonant electrode elements 141. The same applies to other capacitor portions C2 to C5 and capacitive electrode elements 162 to 165.

Although not shown in FIG. 3, in a place near each of the end portions of resonator portions R1 to R5 in the negative direction of the Y-axis, a capacitive electrode protruding toward an adjacent resonator portion in the X-axis direction may be separately formed. A degree of capacitive coupling between the resonator portions can be adjusted in accordance with a Y-axis-direction length of the capacitive electrode protruding in the X-axis direction, a distance from an adjacent distribution constant, and/or the number of electrodes configuring capacitor electrodes.

FIG. 4 is one example of a cross-sectional view of filter device 100 when filter device 100 is taken along a plane along a YZ-plane. In FIG. 4, a cross-sectional view of resonator portion R1 and capacitor portion C1 is representatively exemplified. The sectional shapes of other resonator portions R2 to R5 and capacitor portions C2 to C5 are also the same as the sectional shapes of resonator portion R1 and capacitor portion C1.

As shown in FIG. 4, in filter device 100, end portions of the plurality of resonant electrode elements 141, which form resonator portion R1, in the negative direction of the Y-axis, and end portions of the plurality of capacitive electrode elements 161, which form capacitor portion C1, in the positive direction of the Y-axis are disposed to face each other across gap GP in the Y-axis direction. As a result, resonator portion R1 and capacitor portion C1 are configured to form a capacity in accordance with the capacity of gap GP between end portions facing each other across gap GP in the Y-axis direction.

In filter device 100, ceramic is employed as the material of laminated body 110. When the material of laminated body 110 is ceramic, the material shrinks by heat treatment such as sintering in a manufacturing process, and a "distortion region" in which non-linear distortion in the lamination direction easily occurs exists in an outer peripheral portion of laminated body 110 in the Y-axis direction in many cases due to the influence of the shrinkage. In the distortion region, the distortion in the lamination direction becomes greater than a "stable region" on the inner peripheral side of the distortion region, and the distortion in the lamination direction becomes greater as the outer periphery is approached. Each layer of laminated body 110 extends in a direction along the Y-axis direction without being affected by the distortion in "the stable region" and extends in a direction that intersects with the Y-axis direction as a result of being affected by the distortion in "the distortion region".

In filter device 100 according to the present embodiment, as shown in FIG. 4, a part in resonator portion R1 facing capacitor portion C1 is disposed in "the stable region". As a result, a part of each of the plurality of resonant electrode elements 141 forming resonator portion R1 that faces capacitive electrode elements 161 extends in the direction along the Y-axis direction.

Meanwhile, capacitor portion C1 is disposed in "the distortion region". By disposing capacitor portion C1 in the distortion region, the plurality of capacitive electrode elements 161 forming capacitor portion C1 extend in the direction that intersects with the Y-axis direction except for those disposed near the center in the lamination direction. A distance between elements adjacent to each other in the Z-axis direction out of the plurality of capacitive electrode elements 161 forming capacitor portion C1 (hereinafter also simply referred to as "the distance between capacitive electrode elements 161") increases as the adjacent elements become closer to the outer periphery (in other words, side surface 116) of laminated body 110 in the Y-axis direction.

However, in the present embodiment, the fact that the distance between capacitive electrode elements 161 increases as they become closer to the outer periphery hardly affects the capacity formed between capacitor portion C1 and resonator portion R1. In other words, in filter device 100 according to the present embodiment, a capacity in accordance with the size of gap GP in the Y-axis direction is formed between the end portions of resonator portion R1 and capacitor portion C1, and the size of gap GP in the Y-axis direction is hardly affected by the distortion in the lamination direction (Z-axis direction) and is maintained to be substantially constant. The place near the end portions of capacitor portion C1 in the positive direction of the Y-axis is close to the stable region. Thus, distortion in the lamination direction hardly occurs in the place. Therefore, even when capacitor portion C1 is disposed in the distortion region, the characteristics of filter device 100 can be stabilized. By disposing capacitor portion C1 in the distortion region on the outer peripheral side of the stable region, the upsizing of filter device 100 can be suppressed as compared to a case where capacitor portion C1 is disposed in the stable region. As a result, the characteristics of filter device 100 can be stabilized while the upsizing of filter device 100 is suppressed.

In filter device 100 according to the present embodiment, productization is performed in the state shown in FIG. 4, in other words, a state in which the distance between capacitive electrode elements 161 increases as they become closer to the outer periphery. In other words, in filter device 100, while capacitor portion C1 is disposed in the distortion region, the displacement of the distortion region in the lamination direction caused in the manufacturing process is tolerated. Therefore, for example, measures of restraining an outer peripheral portion of laminated body 110 such that distortion does not occur in the distortion region in the manufacturing process do not need to be taken. Therefore, a case where cracks and the like occur in the outer peripheral portion of laminated body 110 in the Y-axis due to unnecessary stress caused by measures such as restraint can be prevented.

The distortion region of laminated body 110 is also formed in an outer periphery in the positive direction of the Y-axis. Therefore, end portions of resonator portion R1 in the positive direction of the Y-axis are disposed in "the distortion region". Thus, the distance between resonant electrode elements of the plurality of resonant electrode elements 141 adjacent to each other in the Z-axis direction increases as the adjacent elements become closer to side surface 115 in the end portions of resonator portion R1 in the positive direction of the Y-axis as well. In filter device 100 according to the present embodiment, the displacement of the distortion region in the lamination direction as above is tolerated.

As above, in filter device 100 according to the present embodiment, resonator portions R1 to R5 and capacitor portions C1 to C5 are disposed to face each other in the Y-axis direction, and a capacity is formed by end portions of resonator portions R1 to R5 and capacitor portions C1 to C5 facing each other. Capacitor portions C1 to C5 are disposed in the distortion region. Therefore, the characteristics of filter device 100 can be stabilized while the upsizing of filter device 100 is suppressed.

"Side surface 115", "side surface 116", and "laminated body 110" in the present embodiment may correspond to a "first side surface", a "second side surface", and a "laminated body" in the present disclosure, respectively. "Plate electrode 130" and "plate electrode 135" in the present embodiment may correspond to a "first plate electrode" and a "second plate electrode" in the present disclosure, respectively. "Shield terminal 121" and "shield terminal 122" in the present embodiment may correspond to a "first terminal" and a "second terminal" in the present disclosure, respectively. "Resonator portions R1 to R5" in the present embodiment may correspond to a "plurality of resonator portions" in the present disclosure. Each of "resonant electrode elements 141 to 145" in the present embodiment may correspond to a "plurality of resonant electrode elements" in the present disclosure. "The plurality of capacitor portions C1 to C5" in the present embodiment may correspond to a "plurality of capacitor portions" in the present disclosure. "Capacitive electrode elements 161 to 165" in the present embodiment may correspond to a "plurality of capacitive electrode elements" in the present disclosure, respectively. "Connection conductors 151 to 155" in the present embodiment may correspond to a "plurality of connection conductors" in the present disclosure.

In the present embodiment, the dielectric filter (filter device 100) including the plurality of resonator portions R1 to R5 and the plurality of capacitor portions C1 to C5 has been described. However, the present disclosure can also be applied to a dielectric resonator including a combination of any one of the plurality of resonator portions R1 to R5 and one capacitor portion facing the resonator portion (for example, a combination of resonator portion R1 and capacitor portion C1).

Modified Example 1

Figure 5:
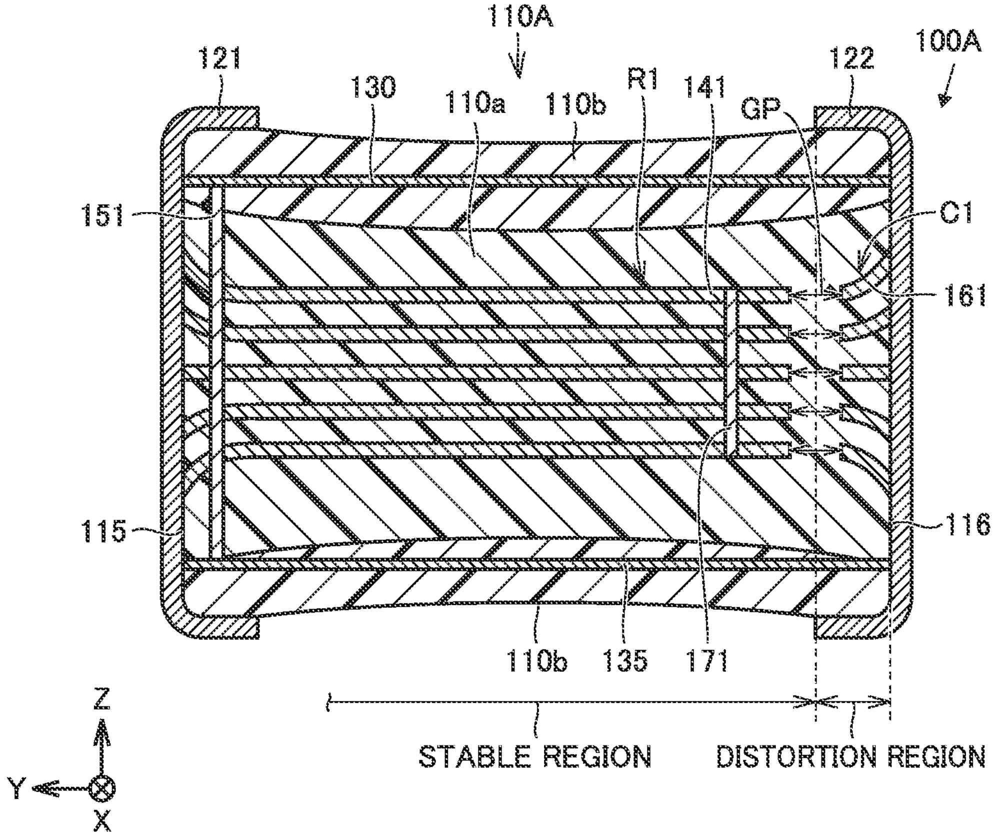
FIG. 5 is one example (part two) of a cross-sectional view of the filter device.

FIG. 5 is one example of a cross-sectional view of a filter device 100A according to Modified Example 1 of the present disclosure when filter device 100A is taken along a plane along a YZ-plane. Filter device 100A is obtained by changing laminated body 110 of filter device 100 described above to a laminated body 110A.

The material of laminated body 110 according to the embodiment described above is one type of ceramic material, but laminated body 110A according to Modified Example 1 has a first portion 110*a* and second portions 110*b* materials of which are different types of ceramic materials with permittivity different from each other. Other configurations of filter device 100A are the same as the configurations of filter device 100 described above.

Laminated body 110A includes first portion 110*a* the material of which is a first ceramic material, and second portions 110*b* the material of which is a second ceramic material that is a type different from that of the first ceramic material.

First portion 110*a* is disposed in a layer in the center of laminated body 110A. Second portions 110*b* are disposed in an upper layer and a lower layer with respect to first portion 110*a*. The second ceramic material that is the material of second portions 110*b* has characteristics in which a shrinkage amount due to the heat treatment is greater than the first ceramic material that is the material of first portion 110*a*.

In laminated body 110A as above, more distortion in the lamination direction may occur in the distortion region as compared to laminated body 110 described above. However, the size of gap GP in the Y-axis direction is hardly affected by the distortion in the lamination direction and is maintained to be substantially constant in the structure as above as well. Therefore, as with the embodiment described above, the characteristics of filter device 100A can be stabilized while the upsizing of filter device 100A is suppressed.

"First portion 110*a*" and "second portion 110*b*" in Modified Example 1 may correspond to a "first portion" and a "second portion" in the present disclosure, respectively.

Modified Example 2

Figure 6:
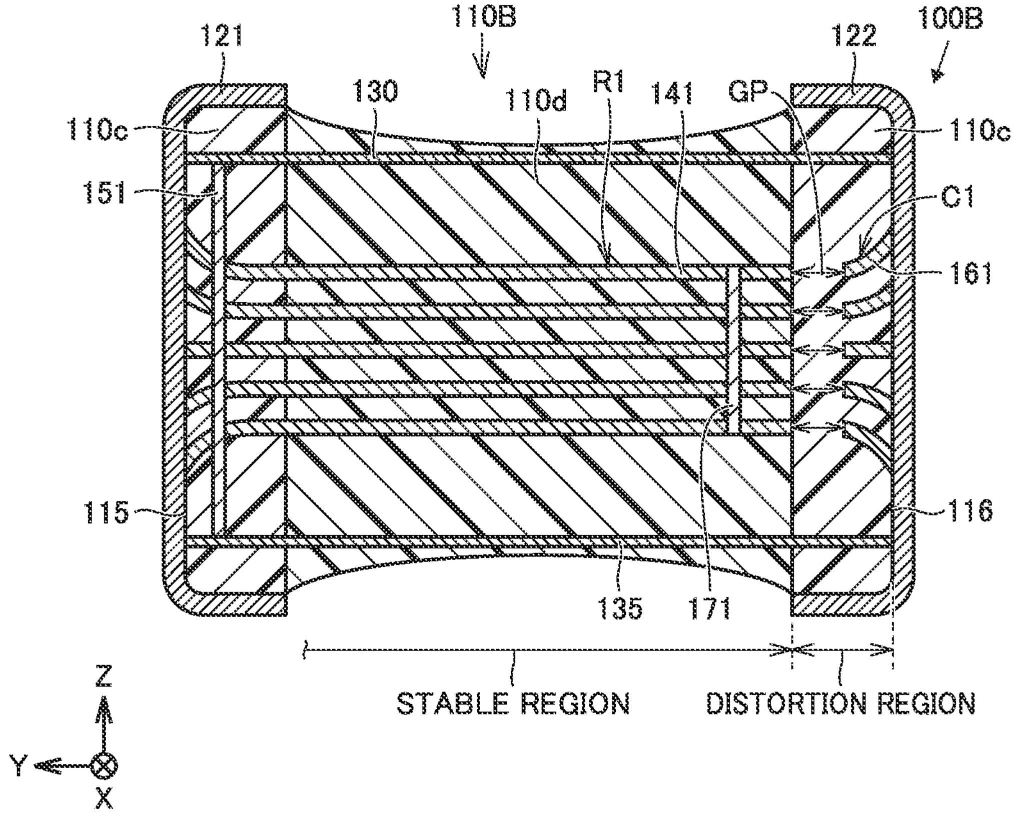
FIG. 6 is one example (part three) of a cross-sectional view of the filter device.

FIG. 6 is one example of a cross-sectional view of filter device 100B according to Modified Example 2 of the present disclosure when filter device 100B is taken along a plane along a YZ-plane. Filter device 100B is obtained by changing laminated body 110 of filter device 100 described above to a laminated body 110B.

The material of laminated body 110 according to the embodiment described above is one type of ceramic material, but laminated body 110B according to Modified Example 2 has first portions 110*c* and a second portion 110*d* materials of which are different types of ceramic materials with permittivity different from each other. Other configurations of filter device 100B are the same as the configurations of filter device 100 described above.

Laminated body 110B includes first portions 110*c* material of which is a first ceramic material, and second portion 110*d* material of which is a second ceramic material that is a type different from the type of the first ceramic material.

First portions 110*c* are disposed in an end portion in the positive direction of the Y-axis and an end portion in the negative direction of the Y-axis in laminated body 110B. Second portion 110*d* is disposed in a region in the center of laminated body 110B in the Y-axis. The second ceramic material that is the material of second portion 110*d* has characteristics in which the shrinkage amount due to the heat treatment is greater than the first ceramic material that is the material of first portion 110*c*.

In laminated body 110B as above, more distortion in the lamination direction may occur in the distortion region as compared to laminated body 110 described above. However, the size of gap GP in the Y-axis direction is hardly affected by the distortion in the lamination direction and is maintained to be substantially constant in the structure as above as well. Therefore, as with the embodiment described above, the characteristics of filter device 100B can be stabilized while the upsizing of filter device 100B is suppressed.

"First portion 110*c*" and "second portion 110*d*" in Modified Example 2 may correspond to the "first portion" and the "second portion" in the present disclosure, respectively.

It is to be understood that the embodiment disclosed above is merely an example in all aspects and in no way intended to limit the disclosure. The scope of the present disclosure is defined by the scope of the claims. All modifications made within the scope and spirit equivalent to those of the claims are intended to be included in the disclosure.

10 communication device, 12 antenna, 20 high-frequency front-end circuit, 22, 28 band-pass filter, 24 amplifier, 26 attenuator, 30 mixer, 32 local oscillator, 40 D/A converter, 50 RF circuit, 100, 100A, 100B filter device, 110, 110A, 110B laminated body, 110*a*, 110*c* first portion, 110*b*, 110*d* second portion, 111 upper surface, 112 lower surface, 113, 114, 115, 116 side surface, 121, 122 shield terminal, 130, 135, PL1 plate electrode, 141 to 145 resonant electrode element, 151 to 155, 171 to 175 connection conductor, 161 to 165 capacitive electrode element, C1 to C5 capacitor portion, GP gap, R1 to R5 resonator portion, T1 input terminal, T2 output terminal, V10, V11 via.

The invention claimed is:

1. A dielectric filter, comprising:

a cuboid laminated body comprising a plurality of dielectric layers laminated in a lamination direction, the cuboid laminated body having a first side surface and a second side surface perpendicular to a first direction orthogonal to the lamination direction;

a first plate electrode and a second plate electrode disposed to be spaced apart from each other in the lamination direction on an inside of the laminated body;

a first terminal and a second terminal that are disposed on the first side surface and the second side surface of the laminated body, respectively, and connected to the first plate electrode and the second plate electrode;

a plurality of resonator portions disposed side by side in a second direction orthogonal to the lamination direction and the first direction in a region between the first plate electrode and the second plate electrode in the laminated body; and a plurality of capacitor portions disposed to face the plurality of resonator portions in the first direction, respectively, in a region between the plurality of resonator portions and the second terminal in the laminated body, wherein:

each of the plurality of resonator portions comprises a plurality of resonant electrode elements laminated in the lamination direction, is connected to the first terminal, and is spaced apart from the second terminal;

each of the plurality of capacitor portions comprises a plurality of capacitive electrode elements laminated in the lamination direction, connected to the second terminal, and provides a capacity between each of the capacitor portions and each of the resonator portions facing each of the capacitor portions in the first direction;

a part of each of the plurality of resonant electrode elements facing the capacitive electrode element extends in a direction along the first direction; and at least one of the plurality of capacitive electrode elements extends in a direction intersecting with the first direction.

2. The dielectric filter according to claim 1, wherein a distance between capacitive electrode elements of the plurality of capacitive electrode elements adjacent to each other in the lamination direction increases as the adjacent capacitive electrode elements become closer to an outer periphery of the laminated body.

3. The dielectric filter according to claim 1, wherein the laminated body includes:

a first portion including a first ceramic material; and a second portion including a second ceramic material different from the first ceramic material.

4. The dielectric filter according to claim 3, wherein the second portion is disposed on an outer side relative to the first portion in the lamination direction.

5. The dielectric filter according to claim 3, wherein the second portion is disposed on an inner side relative to the first portion in the first direction.

6. The dielectric filter according to claim 1, further comprising a plurality of connection conductors connecting each of the plurality of resonator portions to the first plate electrode and the second plate electrode.

7. The dielectric filter according to claim 1, wherein the plurality of capacitor portions are disposed in a first region positioned in an outer peripheral portion in the laminated body in the first direction, and the plurality of resonator portions are disposed in a second region adjacent to the first region in the laminated body.

8. A dielectric resonator, comprising:

a cuboid laminated body comprising a plurality of dielectric layers laminated in a lamination direction, the cuboid laminated body having a first side surface and a second side surface perpendicular to a first direction orthogonal to the lamination direction;

a first plate electrode and a second plate electrode disposed to be spaced apart from each other in the lamination direction on an inside of the laminated body;

a first terminal and a second terminal that are disposed on the first side surface and the second side surface of the laminated body, respectively, and connected to the first plate electrode and the second plate electrode;

a resonator portion disposed in a region between the first plate electrode and the second plate electrode in the laminated body;

a capacitor portion disposed to face the resonator portion in the first direction in a region between the resonator portion and the second terminal in the laminated body, wherein:

the resonator portion comprises a plurality of resonant electrode elements laminated in the lamination direction, is connected to the first terminal, and is spaced apart from the second terminal;

the capacitor portion comprises a plurality of capacitive electrode elements laminated in the lamination direction, is connected to the second terminal, and provides a capacity between the capacitor portion and the resonator portion facing the capacitor portion in the first direction;

a part of each of the plurality of resonant electrode elements facing the capacitive electrode element extends in a direction along the first direction; and at least one of the plurality of capacitive electrode elements extends in a direction intersecting with the first direction.

9. The dielectric filter according to claim 2, wherein the laminated body includes:

a first portion including a first ceramic material; and a second portion including a second ceramic material different from the first ceramic material.

10. The dielectric filter according to claim 2, further comprising a plurality of connection conductors connecting each of the plurality of resonator portions to the first plate electrode and the second plate electrode.

11. The dielectric filter according to claim 3, further comprising a plurality of connection conductors connecting each of the plurality of resonator portions to the first plate electrode and the second plate electrode.

12. The dielectric filter according to claim 4, further comprising a plurality of connection conductors connecting each of the plurality of resonator portions to the first plate electrode and the second plate electrode.

13. The dielectric filter according to claim 5, further comprising a plurality of connection conductors connecting each of the plurality of resonator portions to the first plate electrode and the second plate electrode.

14. The dielectric filter according to claim 2, wherein the plurality of capacitor portions are disposed in a first region positioned in an outer peripheral portion in the laminated body in the first direction, and the plurality of resonator portions are disposed in a second region adjacent to the first region in the laminated body.

15. The dielectric filter according to claim 3, wherein the plurality of capacitor portions are disposed in a first region positioned in an outer peripheral portion in the laminated body in the first direction, and the plurality of resonator portions are disposed in a second region adjacent to the first region in the laminated body.

16. The dielectric filter according to claim 4, wherein the plurality of capacitor portions are disposed in a first region positioned in an outer peripheral portion in the laminated body in the first direction, and the plurality of resonator portions are disposed in a second region adjacent to the first region in the laminated body.

17. The dielectric filter according to claim 5, wherein the plurality of capacitor portions are disposed in a first region positioned in an outer peripheral portion in the laminated body in the first direction, and the plurality of resonator portions are disposed in a second region adjacent to the first region in the laminated body.

18. The dielectric filter according to claim 6, wherein the plurality of capacitor portions are disposed in a first region positioned in an outer peripheral portion in the laminated body in the first direction, and the plurality of resonator portions are disposed in a second region adjacent to the first region in the laminated body.

* * * * *